(12) United States Patent  
de la Torre Vega et al.

(10) Patent No.: US 7,996,166 B2
(45) Date of Patent: Aug. 9, 2011

(54) ISOLATED CAPACITIVE SIGNATURE DETECTION FOR POWERED DEVICES

(75) Inventors: Luis de la Torre Vega, Madrid (ES); Fadi Saibi, Mountain View, CA (US)

(73) Assignee: Agere Systems Inc., Allentown, PA (US)

( * ) Notice: Subject to any disclaimer, the term of this patent is extended or adjusted under 35 U.S.C. 154(b) by 1160 days.

(21) Appl. No.: 11/691,112

(22) Filed: Mar. 26, 2007

(65) Prior Publication Data

US 2008/0238447 A1    Oct. 2, 2008

(51) Int. Cl.
*G01R 27/26* (2006.01)
(52) U.S. Cl. .................. 702/65; 702/60; 363/80
(58) Field of Classification Search .......... 702/57, 702/58, 64, 65, 117; 324/76.11, 76.12, 111, 324/126, 127, 158.1; 363/80
See application file for complete search history.

(56) References Cited

U.S. PATENT DOCUMENTS

| | | | |
|---|---|---|---|
| 4,004,104 A | 1/1977 | Picandet et al. ............... 179/70 |
| 4,761,702 A * | 8/1988 | Pinard ............................ 361/18 |
| 5,138,543 A * | 8/1992 | Harm et al. ............... 363/21.08 |
| 5,305,192 A * | 4/1994 | Bonte et al. ............... 363/21.16 |
| 5,402,329 A * | 3/1995 | Wittenbreder .................. 363/16 |
| 5,461,303 A * | 10/1995 | Leman et al. .................. 323/222 |
| 5,757,625 A * | 5/1998 | Schoofs ........................ 363/21.13 |
| 5,789,959 A | 8/1998 | Dielacher et al. |
| 5,991,172 A * | 11/1999 | Jovanovic et al. ......... 363/21.14 |
| 6,343,026 B1 * | 1/2002 | Perry .............................. 363/65 |
| 6,640,308 B1 | 10/2003 | Keyghobad et al. .......... 713/300 |
| 6,650,070 B1 * | 11/2003 | Hudson et al. ................ 315/312 |
| 6,958,920 B2 * | 10/2005 | Mednik et al. .................... 363/19 |
| 6,967,472 B2 | 11/2005 | Balakrishnan et al. |
| 6,972,969 B1 | 12/2005 | Shteynberg et al. |
| 6,977,824 B1 | 12/2005 | Yang et al. |
| 6,995,991 B1 | 2/2006 | Yang et al. |
| 7,054,170 B2 * | 5/2006 | Yang et al. ................... 363/21.18 |

(Continued)

FOREIGN PATENT DOCUMENTS

DE    103 32 841 A1    2/2005

(Continued)

OTHER PUBLICATIONS

LT1737 Data Sheet, Linear Technology Corporation, Jun. 6, 2005, pp. 1-28.

(Continued)

*Primary Examiner* — Manuel L Barbee
(74) *Attorney, Agent, or Firm* — Mendelsohn, Drucker & Associates, P.C.; Edward J. Meisarosh; Steve Mendelsohn

(57) ABSTRACT

In one embodiment, a method for determining capacitive signature validity of a powered device (PD) attached to power sourcing equipment (PSE) having (i) an isolated side with a primary coil and (ii) a line side with a secondary coil connected to the PD. The method includes determining, on the isolated side, a first time $T_1$ and a corresponding first voltage $V_1$ across the PD. Then generating, on the isolated side, a switching signal used to generate an electrical current through the primary coil. Then determining, on the isolated side, a second time $T_2$ and a corresponding second voltage $V_2$ across the PD, wherein a difference between $V_2$ and $V_1$ is related to the electrical current provided to the primary coil. Then determining the capacitive-signature validity of the PD based on $T_1$, $T_2$, $V_1$, $V_2$, and a resistive signature of the PD.

25 Claims, 5 Drawing Sheets

U.S. PATENT DOCUMENTS

| | | | |
|---|---|---|---|
| 7,057,907 B2 * | 6/2006 | Oh | 363/21.05 |
| 7,061,780 B2 | 6/2006 | Yang et al. | 363/21.16 |
| 7,142,437 B2 * | 11/2006 | Park | 363/18 |
| 7,196,503 B2 * | 3/2007 | Wood et al. | 323/276 |
| 7,259,972 B2 * | 8/2007 | Yang | 363/21.16 |
| 7,280,376 B2 | 10/2007 | McDonald et al. | 363/20 |
| 7,307,390 B2 | 12/2007 | Huynh et al. | |
| 7,362,593 B2 | 4/2008 | Yang et al. | 363/21.16 |
| 7,471,522 B2 | 12/2008 | Ng et al. | 363/21.12 |
| 7,471,531 B2 | 12/2008 | Blaha et al. | 363/97 |
| 7,486,528 B2 | 2/2009 | Yang | 363/21.12 |
| 7,685,440 B2 * | 3/2010 | Blaha et al. | 713/300 |
| 2003/0080723 A1 * | 5/2003 | Chen et al. | 324/76.29 |
| 2005/0169017 A1 | 8/2005 | Muegge et al. | |
| 2005/0285587 A1 | 12/2005 | Yang et al. | |
| 2006/0002155 A1 | 1/2006 | Shteynberg et al. | |
| 2006/0034102 A1 | 2/2006 | Yang et al. | 363/21.13 |
| 2006/0056204 A1 | 3/2006 | Yang et al. | |
| 2006/0117089 A1 | 6/2006 | Karam | |
| 2007/0019445 A1 | 1/2007 | Blaha et al. | 363/21.12 |
| 2007/0024213 A1 * | 2/2007 | Shteynberg et al. | 315/291 |
| 2007/0070664 A1 * | 3/2007 | Chen | 363/95 |
| 2008/0049459 A1 | 2/2008 | Blaha et al. | 363/21.16 |
| 2008/0071260 A1 | 3/2008 | Shores | 606/34 |
| 2008/0192514 A1 | 8/2008 | Zhou et al. | 363/21.12 |
| 2008/0238447 A1 | 10/2008 | de la Torre Vega et al. | 324/676 |

FOREIGN PATENT DOCUMENTS

| | | | |
|---|---|---|---|
| JP | 2001203085 | * | 7/2001 |
| WO | WO 2004/034284 A2 | | 4/2004 |
| WO | WO 2004107602 A1 | | 12/2004 |

OTHER PUBLICATIONS

L. Balogh, "A Practical Introduction to Digital Power Supply Control", Texas Instruments Incorporated, 2005, pp. 6-1 through 6-29. Downloaded from http://focus.ti.com/lit/ml/slup232.pdf, Apr. 5, 2006.

L. Dixon, "Control Loop Cookbook", Texas Instruments Incorporated, 2002, 41 pages. Downloaded from: http://focus.ti.com/lit/ml/slup113a/slup113a.pdf, Apr. 5, 2006.

K. Kittipeerachon, et al., "Feedback Compensation Design for Switched Mode Power Supplies with a Right-Half-Plane (RHP) Zero", Power Electronics, Machines and Drives, 2004, (PEMD 2004). Second International Conference on (Conf. Publ. No. 498), pp. 236-241.

Y-F. Liu, et al., "Digital Control of Switching Power Converters", Proc. of IEEE Conference on Control Applications, Toronto, Canada, Aug. 28-31, 2005, pp. 635-640.

A. Peterchev, et al., "Quantization Resolution and Limit Cycling in Digitally Controlled PWM Converters", IEEE Trans. on Power Electronics, vol. 18, No. 1, Jan. 2003, pp. 301-308.

"Introduction to Power Supplies", National Semiconductor Application Note 556, Sep. 2002, pp. 1-7. Downloaded from: http://www.efficientsupplies.org/pages/intro_to_power_supplies.pdf, Apr. 5, 2006.

* cited by examiner

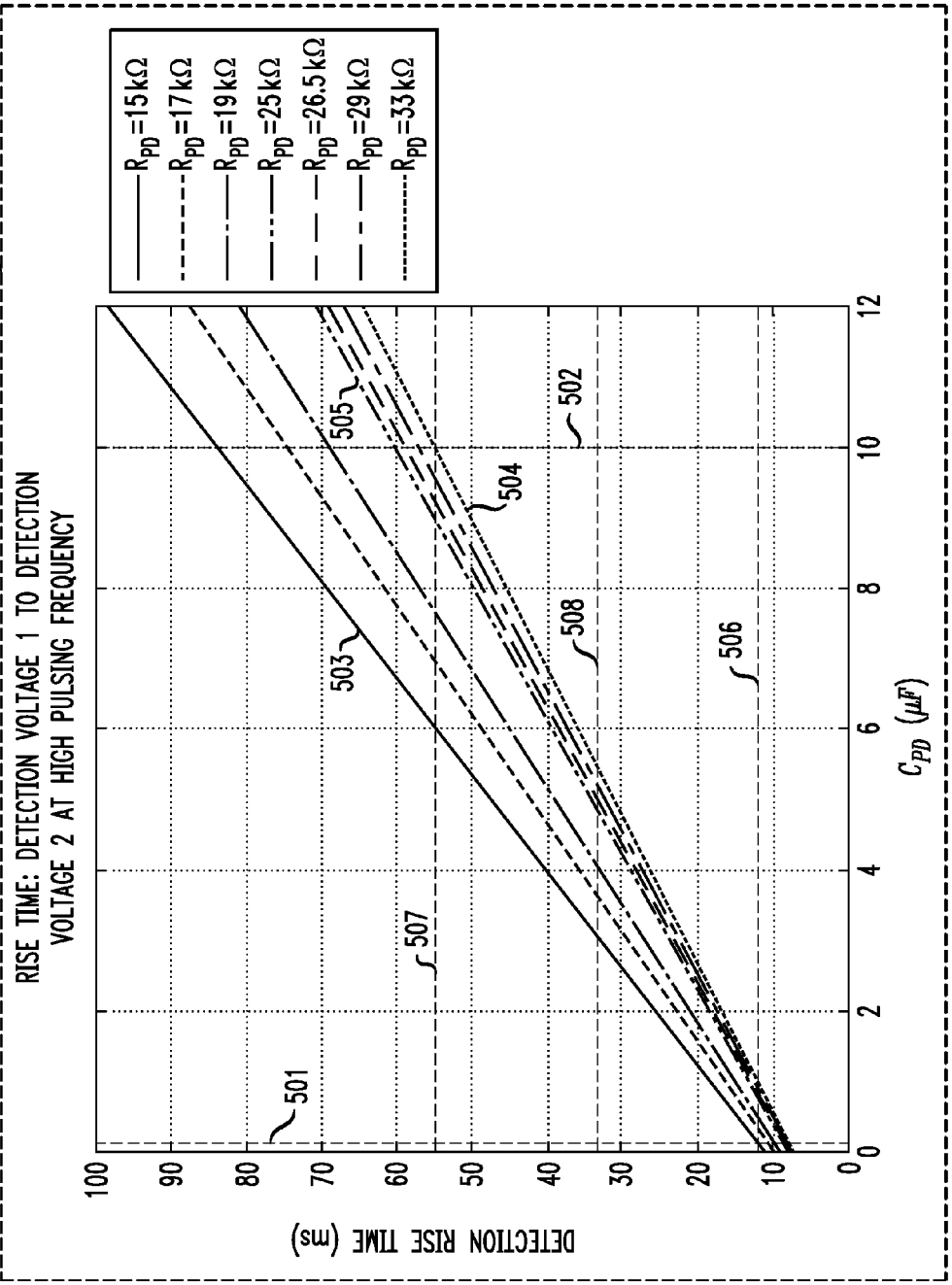

ISOLATED CAPACITIVE SIGNATURE DETECTION FOR POWERED DEVICES

CROSS-REFERENCE TO RELATED APPLICATION

This application contains subject matter related to the subject matter of the following U.S. patent applications: (i) Ser. No. 11/369,057, filed on Mar. 6, 2006, and (ii) Ser. No. 11/536,770, filed on Sep. 29, 2006, which are incorporated herein by reference in their entirety.

BACKGROUND OF THE INVENTION

1. Field of the Invention

The current invention relates to communication networks capable of transmitting electrical power along with data, and more particularly, to systems and methods for the transmission of electrical power in Power-over-Ethernet (PoE) systems.

2. Description of the Related Art

A Power-over-Ethernet system is an Ethernet network capable of transmitting both data and electrical power over twisted wire pair cables, such as category 5 cables. Ethernet communication is currently defined by the IEEE 802.3 standard, and PoE is currently defined by the IEEE 802.3af standard, both of which are incorporated herein by reference. Using PoE allows for the convenient delivery of electrical power to Ethernet client devices, such as Internet telephones or cameras, which may otherwise require more cumbersome powering arrangements in order to operate. PoE allows for the delivery of electrical power using the same cables that transmit Ethernet data.

SUMMARY OF THE INVENTION

In one embodiment, the invention can be a method for characterizing a load connected to power sourcing equipment (PSE) having a power transformer having (i) an isolated side with a primary coil and (ii) a line side with a secondary coil connected to the load. The method comprises: (a) determining, on the isolated side, a first time and a corresponding first voltage across the load, (b) then generating, on the isolated side, a switching signal (i) having a frequency and (ii) used to generate an electrical current through the primary coil, (c) then determining, on the isolated side, a second time and a corresponding second voltage across the load, and (d) then characterizing the load based on the frequency, the first and second voltages, and the first and second times.

In another embodiment, the invention can be a power sourcing equipment (PSE) having a line side and an isolated side. The PSE comprises isolated-side power supply circuitry and a power transformer having (i) a primary coil on the isolated side and (ii) a secondary coil on the line side and connected to a load. The power supply circuitry is adapted to: (a) determine a first time and a corresponding first voltage across the load, (b) generate a switching signal (i) having a frequency and (ii) used to generate an electrical current through the primary coil, (c) determine a second time and a corresponding second voltage across the load, and (d) characterize the load based on the frequency, the first and second voltages, and the first and second times.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 5 shows a sample graph of ΔT vs. capacitive signature, in accordance with an exemplary embodiment of the present invention.

DETAILED DESCRIPTION

Figure 1:
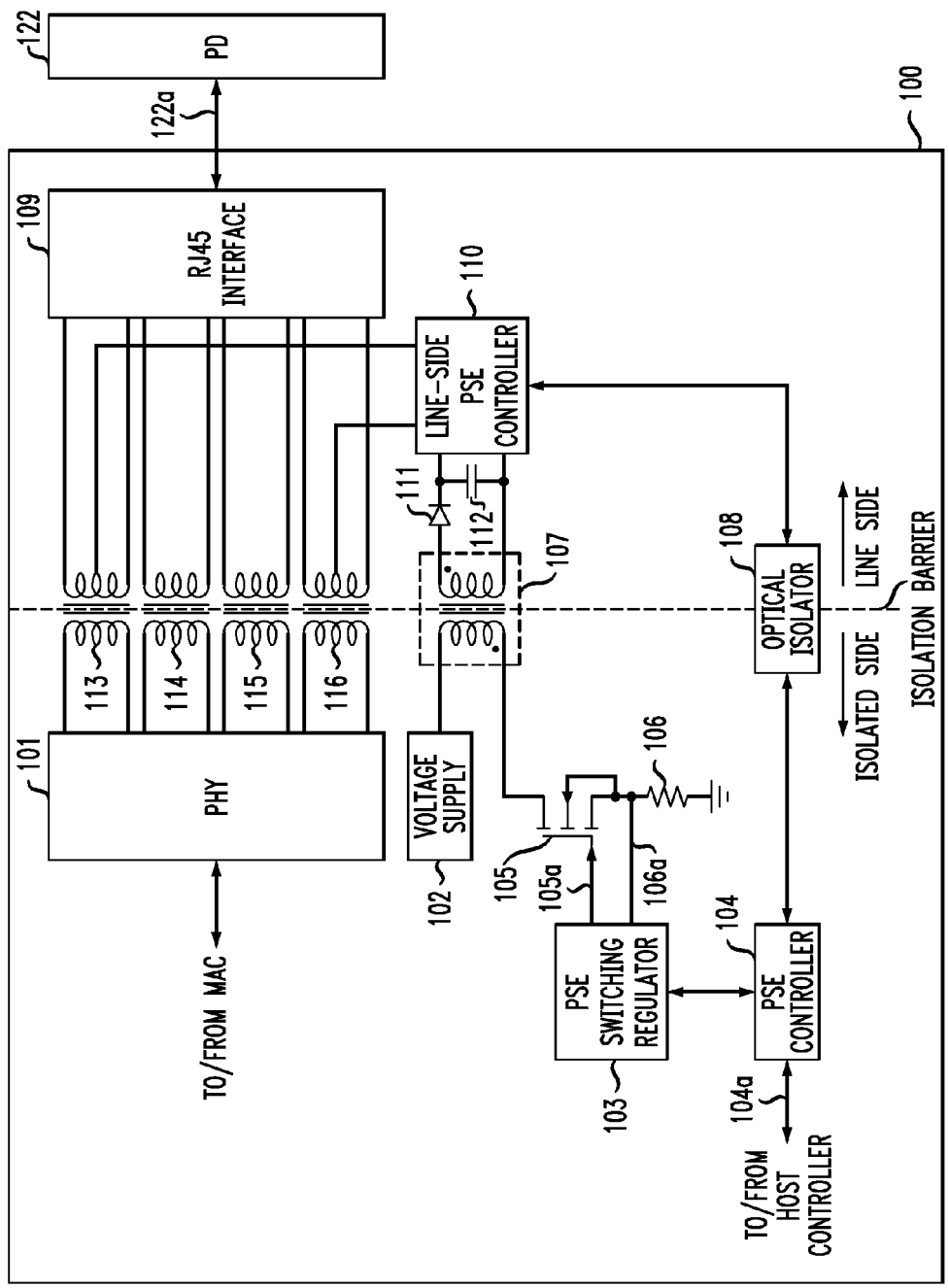
FIG. 1 shows a simplified block diagram of a conventional power sourcing equipment (PSE) port.

FIG. 1 shows a simplified block diagram of conventional power sourcing equipment (PSE) port 100, which is part of a PSE (not shown), which in turn is part of a PoE system that can also comprise powered device (PD) 122. When connected, PD 122 receives its electrical power from PSE port 100 via path 122a. A PSE can have multiple ports, wherein each port is adapted to connect to a separate corresponding PD. A PD can be, for example, a voice-over-IP (VoIP) telephone, a wireless hub, or a networked camera. PSE port 100 supports Ethernet communication services in accordance with the Ethernet standard, as well as the provision of electrical power in compatibility with the PoE standard. Ethernet communication is supported by physical-layer module (PHY) 101, which connects to RJ45 interface 109 via signal-isolation transformers 113, 114, 115, and 116. RJ45 interface 109 in turn connects to the RJ45 interface (not shown) of PD 122 via cable path 122a, which may include multiple cables, such as category 5 unshielded twisted pair cables as well as connectors. PHY 101 also connects to a media access controller (MAC) (not shown).

Transformers 113, 114, 115, and 116 support electrical isolation between the so-called isolated side of PSE port 100 and the so-called line side of PSE port 100. The isolated side is on the primary side of the transformers of PSE port 100, while the line side is on the secondary side of the transformers of PSE port 100. The two sides are isolated by an isolation barrier, represented in FIG. 1 as a dashed line, which helps protect sensitive devices on the isolated side from electrical surges on the line side. The isolation barrier is also supported by power transformer 107 and optical isolator 108. The isolated side of PSE port 100 comprises PHY 101, voltage supply 102, PSE switching regulator 103, PSE controller 104, transistor 105, and current-sense resistor 106. PSE switching regulator 103 can determine the current flowing through transistor 105 by measuring, via path 106a, the voltage across current-sense resistor 106, which has a relatively low resistance value. The line side of PSE port 100 comprises RJ45 interface 109, line-side PSE controller 110, diode 111, and capacitor 112. PSE port 100 further comprises devices supporting the isolation barrier, specifically, optical isolator 108 and transformers 107, 113, 114, 115, and 116 which are located on both sides of the isolation barrier. It should be noted that ports might share some components. For example, several ports might use the same voltage supply, PSE controller, or line-side PSE controller. Also, single physical components might support multiple ports, such as an octal PHY that can support eight ports. Thus, unless otherwise indicated or necessary, references herein and in the figures to particular elements refer to functional units and do not limit their physical implementation.

PSE port 100 provides electrical power to PD 122 via power transformer 107. The operation of transistor 105 is controlled by PSE switching regulator 103 via path 105*a*. If transistor 105 is on, then current flows through the primary coil of transformer 107. If transistor 105 is on, then due to diode 111, substantially no current flows through the secondary coil of transformer 107. When transistor 105 is turned off, current substantially stops flowing through the primary coil of transformer 107. Current then starts to flow through the secondary coil of transformer 107 as the electromagnetic energy built up in the primary coil of transformer 107 is transferred to its secondary coil. The current through the secondary coil starts at a level proportional to the current that was flowing through the primary coil, possibly exhibiting an initial spike, and either steadily declines all the way to zero, or drops to zero with the turn-on of transistor 105, which starts the cycle anew.

PSE switching regulator 103 can operate transistor 105 in continuous or discontinuous mode. A single switching cycle comprises two intervals: (i) on, or T_on, when transistor 105 is turned on, and (ii) off, or T_off, when transistor 105 is turned off. In discontinuous-mode operation, the current through the secondary coil of transformer 107 drops substantially to zero during the T_off interval of the switching cycle, i.e., before transistor 105 is turned on again. In continuous-mode operation, the current through the secondary coil of transformer does not drop to zero during the T_off interval, i.e., before transistor 105 is turned on again. As already noted, in both modes of operation, the current through the secondary coil of transformer 107 is substantially zero during the T_on interval of a switching cycle.

PSE switching regulator 103 may be controlled by PSE controller 104, which can receive information regarding power usage by PD 122 from line-side PSE controller 110, via optical isolator 108. PSE controller 104 communicates with a host controller (not shown) via path 104*a*. Alternatively, switching regulator 103 can be set to provide a predefined switching signal, whereupon line-side PSE controller 110 can regulate the actual electrical power provided to PD 122.

Line-side PSE controller 110 can communicate with PSE controller 104 through optical isolator 108. Optical isolator 108 comprises a light-emitting diode (LED) and a phototransistor or photodiode for electrically-isolated transmission of information from the line side to the isolated side. Line-side PSE controller 110 performs several PoE-related functions, including detection, optional classification, and fault monitoring. Detection comprises detecting whether a PoE-compliant PD has been connected to PSE port 100 by measuring currents and/or voltages. Classification comprises attempting to determine the expected power usage of the PD. After the detection of a valid PD, power may be provided to the PD. If the PSE does not detect a valid PD connected to PSE port 100, then power is not provided by PSE port 100.

Before PSE port 100 will provide power via RJ-45 interface 109, it must be determined that a valid PD is connected to PSE port 100 via RJ-45 interface 109. One of the tests used to determine whether a valid PD is connected to PSE port 100 is PoE capacitive signature detection. PoE capacitive signature detection determines whether the electrical capacitance of an attached device is within the allowed range specified by the PoE standard. A valid PD typically includes a front-end containing an element called the signature block that includes a signature capacitor. The signature capacitor is typically isolated from some other parts of the PD's circuitry until after successful detection of the PD by the PSE.

The 802.3af PoE standard requires that a PSE (i) accept as valid a PD determined to have a signature capacitance of 0.15 μF (150 nF) or less, and (ii) reject as invalid a PD determined to have a signature capacitance of 10 μF or more. For intermediate measured values, i.e., 0.15-10 μF, determination of validity of capacitive signature is PSE-implementation-specific. There also exist legacy, pre-802.3af, PoE-compatible PDs that have a different valid capacitive signature range. These legacy PDs are considered valid PDs if the PSE detects a capacitive signature of between 47 and 470 μF.

In the PoE capacitive signature detection process, line-side PSE controller 110 provides a fixed probing current $I_{probe}$ to path 122*a* for a fixed time period ΔT, which, assuming PD 122 is attached and valid, charges a signature capacitor in PD 122. Line-side PSE controller 110 measures the resultant voltage change ΔV over the time period ΔT to determine the signature capacitor's capacitance $C_{sig}$, based on the relationship below:

$$\Delta V = \frac{I_{probe}}{C_{sig}} \cdot \Delta T \Rightarrow C_{sig} = \frac{I_{probe}}{\Delta V} \cdot \Delta T \tag{1}$$

For example, if line-side PSE controller 110 provides an $I_{probe}$ current of 25 mA for a time period ΔT of 20 ms, resulting in a ΔV of 5V, then PSE port 100 would determine that an attached device has a capacitive signature of 0.1 μF, indicating a valid capacitive signature.

If an attached PD has a short circuit instead of a valid signature capacitor then ΔV would be zero. In fact, detection can terminate as soon as it is determined that the probing current does not cause a rise in measured voltage, indicating an invalid capacitive signature. If no PD is attached to PSE port 100, then there is an open circuit and line-side PSE controller 110 might not be able to provide the probing current, indicating an invalid capacitive signature. Capacitive signature detection can terminate as soon as the inability to provide the probing current is determined.

Moving the components performing the functionality of the line-side PSE controller to the isolated side may help reduce the cost of a PSE device by reducing the number of individual components needed since the move would allow the line-side PSE controller to be integrated with the PSE controller of the isolated side on a single integrated circuit, and would allow the optical isolator to be altogether eliminated. Such integration is not, however, obligatory.

Figure 2:
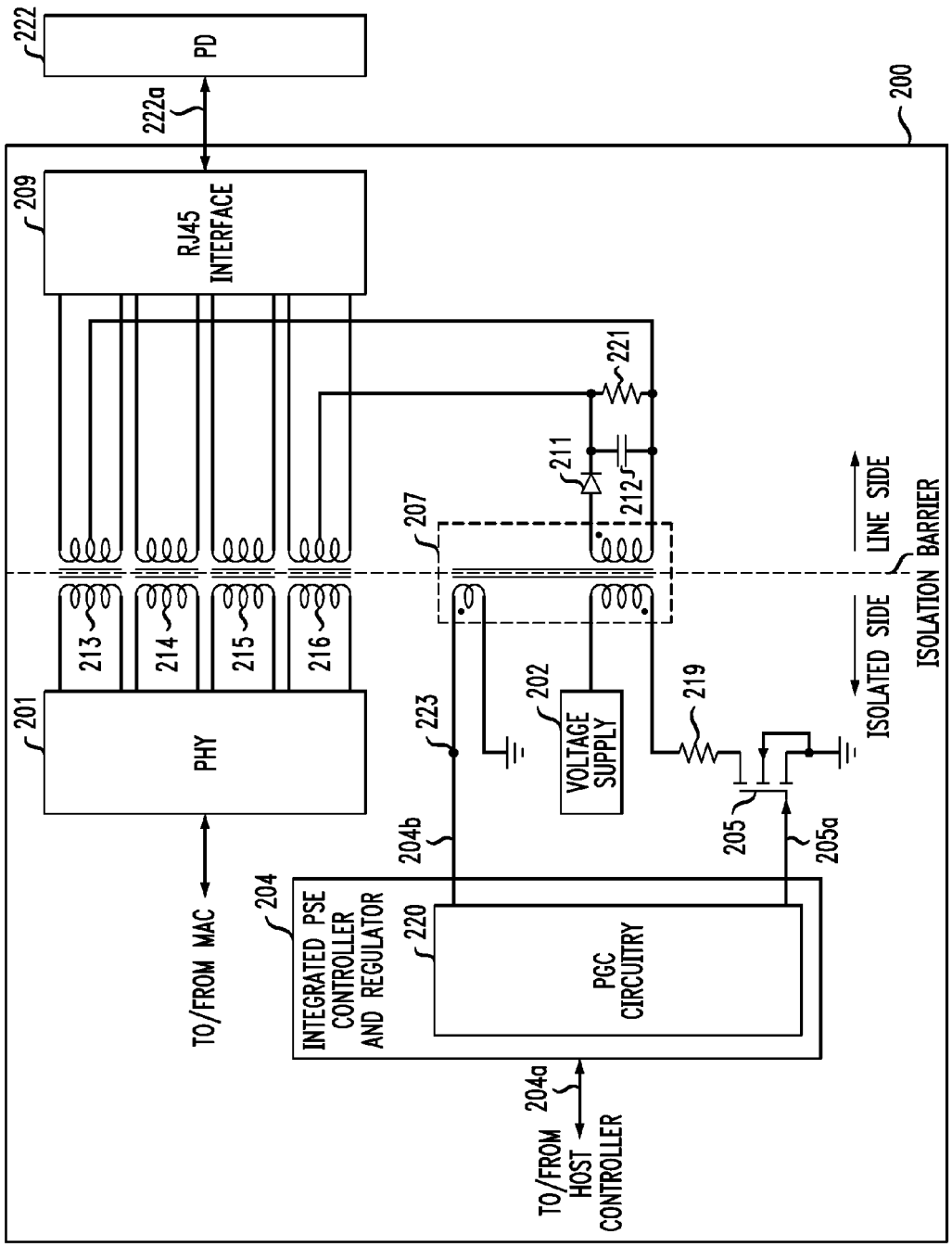
FIG. 2 shows a simplified block diagram of a PSE port in accordance with one embodiment of the present invention.

FIG. 2 shows a simplified block diagram of PSE port 200 in accordance with one embodiment of the present invention. Elements in FIG. 2 that are similar to elements in FIG. 1 are similarly labeled, but with a different prefix. The line side of PSE port 200 comprises RJ45 interface 209, diode 211, smoothing capacitor 212, and optional parallel resistor 221. The isolated side of PSE port 200 comprises PHY 201, voltage supply 202, integrated PSE controller and regulator 204, transistor 205, and current-limiting resistor 219. Supporting the isolation barrier, and having components on both the isolated side and the line side of PSE port 200, are signal-isolation transformers 213, 214, 215, and 216, and power transformer 207. Current-limiting resistor 219 is useful for more precise control and/or determination of the current flowing through the primary coil of power transformer 207. One exemplary implementation of PSE port 200 uses the following values for components: 120Ω for current-limiting resistor 219, 100 kΩ for parallel resistor 221, 5.35 μH for the inductance of the primary coil of transformer 207, and 2 μF for smoothing capacitor 212.

While some functionality has migrated to the isolated side in PSE port 200 as compared to PSE port 100 of FIG. 1, power conditioning has not migrated and continues to be performed on the line side of PSE port 200. Diode 211 and capacitor 212 represent a simple power conditioning circuit; however, power conditioning can be provided by components other than or in addition to diode 211 and capacitor 212. Optional resistor 221 may be placed in parallel with capacitor 212 for purposes such as reduced shutdown time or improved regulation at low loads.

Power transformer 207 comprises three coils: (i) a primary coil connected between voltage supply 202 and resistor 219, (ii) a secondary coil connected to diode 211 and capacitor 212, and (iii) an auxiliary coil connected between integrated PSE controller and regulator 204 and a reference node (e.g., ground). Although FIG. 2 shows the secondary coil outputs connected to a particular pair of signal-isolation transformers, the secondary coil may be connected to any appropriate pair of signal-isolation devices. The voltage across the auxiliary coil of power transformer 207, which can be measured at voltage-sensing node 223, depends on the voltages across the primary coil and/or the secondary coil, as well as the ratios and orientations of turns between the auxiliary coil and the primary and secondary coils.

Integrated PSE controller and regulator 204 combines the functions previously performed by a PSE switching regulator, a PSE controller, and a line-side PSE controller, such as FIG. 1's PSE switching regulator 103, PSE controller 104, and line-side PSE controller 110. Integrated PSE controller and regulator 204 is able to perform capacitive signature detection from the isolated side; however, the task is complicated by several factors, such as (i) the presence of capacitor 212 and optional resistor 221 in the probing path, and (ii) the absence of a line-side PSE controller that can easily provide and measure precise currents and voltages. As described in greater detail below, integrated PSE controller and regulator 204 can perform capacitive signature detection by measuring the transfer of electrical power through transformer 207 and accounting for capacitor 212 and resistor 221.

Integrated PSE controller and regulator 204 comprises pulse generation and control (PGC) circuitry 220. PGC circuitry 220 measures the voltage across the auxiliary coil of transformer 207, using path 204b, when the voltage across the auxiliary coil is proportional to the voltage across the secondary coil, i.e., when transistor 205 is off. PGC circuitry 220 uses the voltage measure in capacitive signature detection, and can also use the voltage measure as feedback to regulate the voltage provided to PD 222 by PSE port 200; however, voltage regulation is not necessary during capacitive signature detection. PGC circuitry 220 controls the operation of transistor 205 via path 205a. During capacitive signature detection, PGC circuitry 220 provides a switching signal comprising a series of pulses whose pulse width and frequency are substantially constant. During capacitive signature detection, PGC circuitry 220 operates in discontinuous mode.

In discontinuous-mode operation, during each switching cycle, the electrical energy flowing through the primary coil of transformer 207 is substantially completely transferred to the secondary coil of transformer 207, subject to the power transfer efficiency η of transformer 207, which is a physical and determinable characteristic of transformer 207. The energy $E_{cycle}$ transferred during each switching cycle can substantially be represented by the formula below:

$$E_{cycle} = \eta \cdot \frac{1}{2} L_P \cdot I_{pk}^2 \qquad (2)$$

wherein $L_P$ is the inductance of the primary coil of transformer 207, and $I_{pk}$ is the current through the primary coil of transformer 207 at the end of the T_on interval of the switching cycle. In discontinuous-mode operation, current $I_{pk}$ starts at substantially zero at the start of a T_on interval of the switching cycle and rises exponentially towards $V_{in}/R_{lim}$, wherein $V_{in}$ is the voltage supplied by voltage supply 202, and $R_{lim}$ is the resistance of current-limiting resistor 219. If the T_on interval is appropriately chosen, then $I_{pk}$ is substantially equal to $V_{in}/R_{lim}$ and the energy transferred during each switching cycle can substantially be represented by the formula below:

$$E_{cycle} = \eta \cdot \frac{1}{2} L_P \cdot \left(\frac{V_{in}}{R_{lim}}\right)^2 \qquad (3)$$

To determine whether a connected PD has a valid capacitive signature, PSE port 200 relies on constant power injection from the primary coil of transformer 207 to the secondary coil of the transformer. PGC circuitry 220 provides a switching signal of substantially constant pulse width and frequency F to transistor 205 so that constant electrical power is provided by the primary coil of transformer 207 to the secondary coil. The power $P_{prim}(F)$ transferred from the primary coil of transformer 207 to the secondary coil of transformer 207 in discontinuous-mode operation at the switching frequency F can substantially be represented by the equation below:

$$P_{prim}(F) = E_{cycle} \cdot F = F \cdot \eta \cdot \frac{1}{2} L_P \cdot \left(\frac{V_{in}}{R_{lim}}\right)^2 \qquad (4)$$

The energy $E_{LS}$ stored in the line-side system during capacitive signature detection can be substantially represented by the equation below:

$$E_{LS} = \frac{1}{2} C_{TLS} \cdot V^2 \Rightarrow V^2 = \frac{2E_{LS}}{C_{TLS}} \qquad (5)$$

wherein $C_{TLS}$ is the total line-side capacitance and V is the line-side voltage provided to the PD. The power $P_{LS}$ dissipated by the line side during capacitive signature detection can be substantially represented by the equation below:

$$P_{LS} = \frac{V^2}{R_{TLS}} \qquad (6)$$

wherein $R_{TLS}$ is the total line-side resistance.

The instantaneous change in power $d(E_{LS})/dt$ in the line-side system during capacitive signature detection can be derived from equations (4) and (6) and represented by the equation below:

$$\frac{d(E_{LS})}{dt} = P_{prim}(F) - P_{LS} = E_{cycle} \cdot F - \frac{V^2}{R_{TLS}} \quad (7)$$

Equation (7) in combination with equation (5) yields the equation below:

$$\frac{d(E_{LS})}{dt} = E_{cycle} \cdot F - \frac{2E_{LS}}{R_{TLS} \cdot C_{TLS}} \quad (8)$$

In order to put the above equation into an equivalent different form, we use the constant $E^0$, which is an asymptotic value of $E_{LS}$ as time goes to infinity, i.e., it is a stable equilibrium value for $E_{LS}$. $E^0$ is represented by the equation below:

$$E^0 = \frac{1}{2} R_{TLS} \cdot C_{TLS} \cdot E_{cycle} \cdot F \quad (9)$$

Multiplying the first term on the right side of equation (8) by $E^0/E^0$, reordering terms, and incorporating $E^0$ on the left side results in the equation below:

$$\frac{d(E_{LS} - E^0)}{dt} = \frac{2E^0}{R_{TLS} \cdot C_{TLS}} - \frac{2E_{LS}}{R_{TLS} \cdot C_{TLS}} = -\frac{2}{R_{TLS} \cdot C_{TLS}}(E_{LS} - E^0) \quad (10)$$

Using natural logarithms with equation (10) results in the equation below:

$$\frac{d(\ln|E_{LS} - E^0|)}{dt} = -\frac{2}{R_{TLS} \cdot C_{TLS}} \quad (11)$$

During capacitive signature detection, PGC circuitry 220 determines the line-side voltage provided to the PD at two points in time, $T_1$ and $T_2$, whose difference is represented by $\Delta T$, obtaining corresponding line-side voltages $V_1$ and $V_2$, respectively. Alternatively, PGC circuitry 220 measures the time $\Delta T$ it takes to bring up the line-side voltage from $V_1$ to $V_2$. The line-side energies $E_{LS}$ corresponding to $V_1$ and $V_2$ are represented by $E_1$ and $E_2$, which are typically both less than $E^0$. Working with equation (11) results in the equation below for line-side energies $E_1$ and $E_2$ at times $T_1$ and $T_2$:

$$\ln\left(\frac{E_2 - E^0}{E_1 - E^0}\right) = -\frac{2}{R_{TLS} \cdot C_{TLS}}(T_2 - T_1) = -\frac{2}{R_{TLS} \cdot C_{TLS}} \Delta T \quad (12)$$

Solving equation (12) for $\Delta T$ results in the equation below:

$$\Delta T = \frac{1}{2} \ln\left(\frac{E^0 - E_1}{E^0 - E_2}\right) \cdot R_{TLS} \cdot C_{TLS} \quad (13)$$

Using equations (5) and (9) in equation (13) and simplifying terms results in the equation below, representing the relationship between $\Delta T$ and the two line-side voltages $V_1$ and $V_2$:

$$\Delta T = \frac{1}{2} \ln\left(\frac{E_{cycle} \cdot F - V_1^2/R_{TLS}}{E_{cycle} \cdot F - V_2^2/R_{TLS}}\right) R_{TLS} \cdot C_{TLS} \quad (14)$$

$R_{TLS}$ is substantially equal to the PD signature resistance $R_{load}$ as affected by the overall resistance $R_{ll}$ of any resistors in PSE port 200, such as resistor 221, which are in parallel to the resistive signature resistor of PD 222. The total line-side resistance $R_{TLS}$ can substantially be represented by the equation below:

$$R_{TLS} = \frac{R_{load} \cdot R_{ll}}{R_{load} + R_{ll}} \quad (15)$$

$C_{TLS}$ is substantially equal to the PD signature capacitance $C_{sig}$ as affected by the overall capacitance $C_{ll}$ of any capacitors in PSE port 200, such as smoothing capacitor 212, which are in parallel to the capacitive signature capacitor of PD 222. The total line-side capacitance $C_{TLS}$ can substantially be represented by the equation below:

$$C_{TLS} = C_{sig} + C_{ll} \quad (16)$$

Using equations (4) and (14) results in the equation below for $\Delta T$:

$$\Delta T = \frac{1}{2} \ln\left(\frac{F \cdot \eta \cdot \frac{1}{2} L_P \cdot \left(\frac{V_{in}}{R_{lim}}\right)^2 - V_1^2/R_{TLS}}{F \cdot \eta \cdot \frac{1}{2} L_P \cdot \left(\frac{V_{in}}{R_{lim}}\right)^2 - V_2^2/R_{TLS}}\right) R_{TLS} \cdot C_{TLS} \quad (17)$$

The values for $V_{in}$, $R_{lim}$, $\eta$, $L_P$, $R_{ll}$, and $C_{ll}$ are known to integrated PSE controller and regulator 204 before PD 222 is attached to PSE port 200 via path 222a. The value for the fixed frequency F can be preprogrammed, or can be set by integrated PSE controller and regulator 204 in operation. The value of $R_{load}$ can be derived from a resistive signature detection successfully performed prior to performing capacitive signature detection. Alternatively, a valid resistive signature can be assumed and an appropriate $R_{load}$ value or range of values can be used for capacitive signature detection. As will be explained below, if PSE port 200 does not care about the precise value of $C_{sig}$, but only cares to insure that valid capacitive signature values that, in accordance with the PoE standard, must be accepted are accepted and that invalid capacitive signature values that, in accordance with the PoE standard, must be rejected are rejected, then the precise value of $R_{load}$ is not needed and the range of valid $R_{load}$ values is sufficient.

Various triggers may be set to prompt integrated PSE controller and regulator 204 to perform capacitive signature detection. Integrated PSE controller and regulator 204 can attempt capacitive signature detection after a successful resistive signature detection indicates the possible presence of a valid PD. Alternatively, integrated PSE controller and regulator 204 can attempt capacitive signature detection every time it attempts to detect a valid PD connected to PSE port 200. For example, integrated PSE controller and regulator 204 could attempt to detect a valid PD intermittently, with intervals determined by a system clock.

If integrated PSE controller and regulator 204 determines to perform capacitive signature detection, then PGC circuitry 220 provides a switching signal of substantially constant pulse-width and frequency to transistor 205 via path 205a. At time $T_1$, PGC circuitry 220 determines line-side voltage $V_1$ based on the voltage across the auxiliary coil of transformer 207, as sensed at voltage-sensing node 223. PGC circuitry 220 continues to provide the switching signal of substantially constant pulse-width and frequency, thereby injecting substantially constant power to the line side, for a time period $\Delta T$, the end of which is time $T_2$. At time $T_2$, PGC circuitry 220 determines the line-side voltage $V_2$ as described above. Using the measured and known quantities above, and equations (15)-(17), the value of $C_{sig}$ can be determined. The determined value of $C_{sig}$ is then compared to the predetermined threshold values for signature capacitance to determine whether $C_{sig}$ is a valid signature capacitance.

The amount of time, or number of switching-signal cycles, before time $T_1$ that the switching signal of substantially constant pulse-width and frequency is generated should be sufficient so that the PSE and the PD are operating in a stable manner. In one typical implementation, $V_1$ is greater than the maximum offset voltage affecting the signature block of the PD, which is typically around 2V. Voltage offsets are caused by intermediary components such as diodes, which may be used in bridge rectifiers in the PD. In alternative implementations, $V_1$ may be a positive voltage less than the maximum offset voltage, 0V, or even a negative voltage. In one typical implementation, $V_2$ is higher than $V_1$, since a typical PSE is designed to provide only positive power to the PD. In an alternative implementation, $V_2$ may be lower than $V_1$, wherein electrical power is dissipated on the line side of the power transformer at a higher rate than electrical power is injected from the isolated side into the line side.

Figure 3:
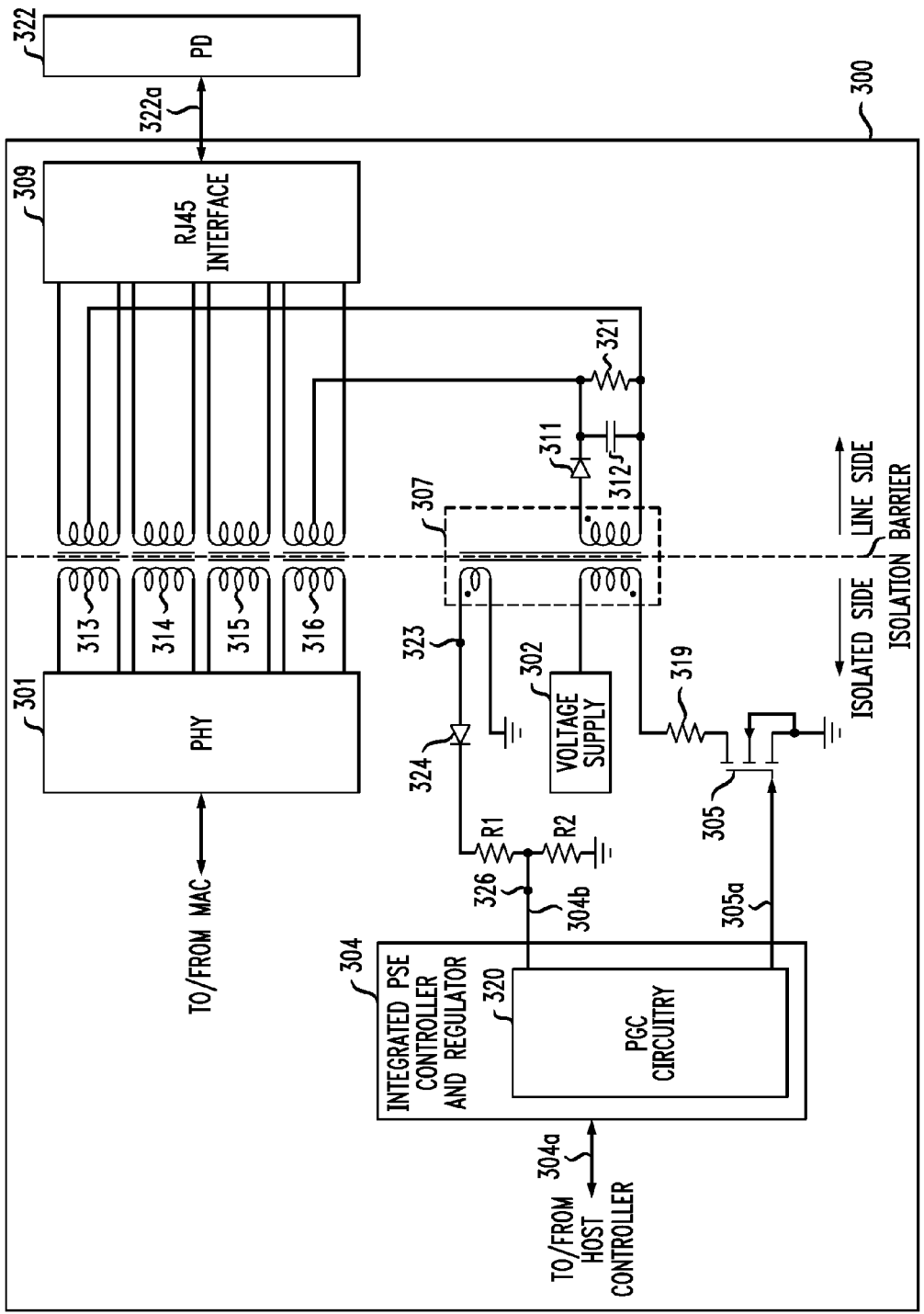
FIG. 3 shows a simplified block diagram of a PSE port in accordance with another embodiment of the present invention.

FIG. 3 shows PSE port 300 in accordance with an embodiment of the present invention. Unless otherwise indicated, elements in FIG. 3 that are similar to corresponding elements of FIG. 2 are similarly labeled, but with a different prefix. PSE port 300 comprises (i) RJ45 interface 309, diode 311, capacitor 312, and optional resistor 321 on the line side; (ii) PHY 301, integrated PSE controller and regulator 304, transistor 305, voltage supply 302, current-limiting resistor 319, resistors R1 and R2, and diode 324 on the isolated side; and (iii) transformers 313, 314, 315, 316, and 307 on both the line and isolated sides, supporting the isolation barrier.

Diode 324 prevents the flow of current through the auxiliary coil of power transformer 307 if transistor 305 is on, i.e., during the on intervals when current is flowing through the primary coil of transformer 307. As noted above, during the on interval, the voltage across the auxiliary coil, which can be measured at voltage-sensing node 323, is substantially proportional to the voltage across the primary coil and/or the voltage across the secondary coil. Because of the arbitrary voltage drop across the reverse-biased diode 311, information about the output voltage of interest is not directly provided by the auxiliary coil of transformer 307 during the on interval. Thus, using diode 324 reduces the overall electrical power consumed by PSE port 300 without materially degrading the ability of integrated PSE controller and regulator 304 to monitor the voltage on the line side. Diode 324 is also useful to help avoid negative voltages from getting provided to integrated PSE controller and regulator 304.

Resistors R1 and R2 form a voltage divider for the voltage across the auxiliary coil of transformer 207. The output of the voltage divider, measurable at voltage-sensing node 326, is provided to integrated PSE controller and regulator 304 via voltage feedback path 304b. By scaling down the voltage across the auxiliary coil of transformer 307, as would be measurable at node 323, the voltage divider allows integrated PSE controller and regulator 304 to measure voltages higher than it might normally be able to safely handle. Sample values for R1 and R2 are 15 kΩ and 5 kΩ, respectively, which would scale down the voltage value at node 323 by a factor of 4. Appropriate scaling of the voltage sensed by integrated PSE controller and regulator 304 is performed to account for the resistor ratio of the voltage divider.

Figure 4:
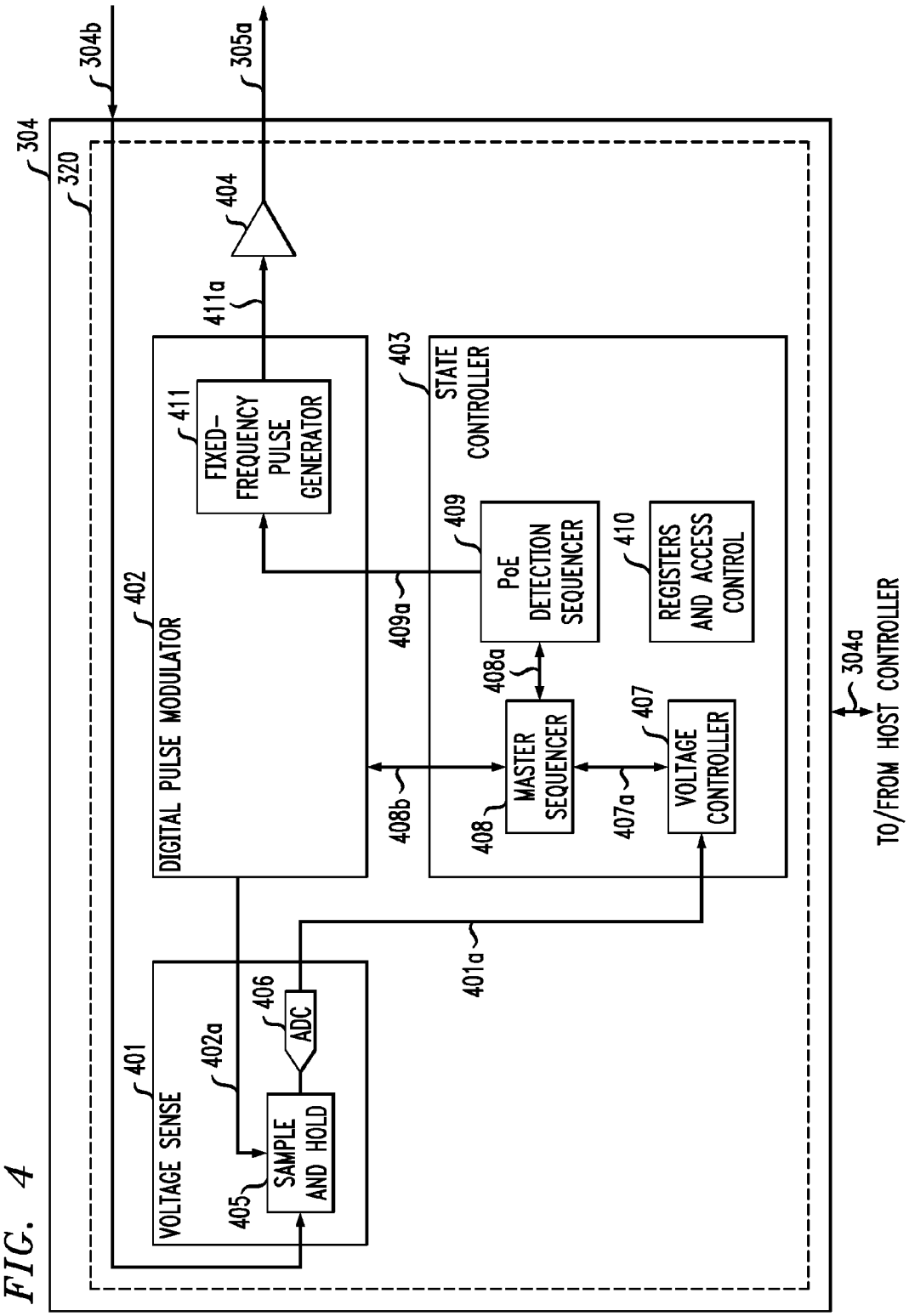
FIG. 4 shows a simplified block diagram of an implementation of the integrated PSE controller and regulator of FIG. 3.

FIG. 4 shows a simplified block diagram of an implementation of integrated PSE controller and regulator 304 of FIG. 3, which comprises PGC circuitry 320. PGC circuitry 320 comprises voltage-sensing module 401, digital pulse modulator 402, state controller 403, transistor driver 404, as well as additional components (not shown) that may be appropriate. Voltage-sensing module 401 senses the voltage at node 326 of FIG. 3, which is a function of the voltage at node 323, as modified by diode 324 and the voltage divider comprising resistors R1 and R2. Digital pulse modulator 402 comprises fixed-frequency pulse generator 411, which generates a switching signal of substantially constant pulse-width and frequency. The frequency and pulse-width of the switching signal generated by fixed-frequency pulse generator 411 are fixed so that transformer 307 operates in discontinuous mode.

Voltage-sensing module 401 comprises sampler 405 and analog-to-digital converter (ADC) 406. Sampler 405 samples the voltage at node 326 via path 304b, as triggered by digital pulse modulator 402 via path 402a, and holds the sampled analog voltage. The triggering occurs so as to get an accurate measure of the voltage on the secondary side of transformer 307. For example, the sampling triggering can be set to occur a brief offset period after the downtick of a switching pulse generated by digital pulse modulator 402, i.e., during the early part of a T_off interval of transistor 305. A temporal offset is used to avoid sampling error that may result from transient effects immediately after a pulse downtick.

Sampler 405 provides the held sampled voltage to ADC 406, which converts the analog voltage input into a digital value, which is in turn provided to state controller 403 via path 401a. In some embodiments, transient effects are mitigated by frequency-domain and/or time-domain filtering.

State controller 403 controls the voltage regulation and fixed-frequency signal generation functions of PGC circuitry 320. State controller 403 comprises voltage controller 407, master sequencer 408, PoE detection sequencer 409, and registers and access control module 410. Registers and access control module 410 contains memory registers that cache values used by other elements of PGC circuitry 320. For example, the cached values can include frequency values, time values, and voltage values. Registers and access control module 410 communicates with other elements of PGC circuitry 320 through appropriate paths (not shown). Master sequencer 408 controls voltage controller 407 and PoE detection sequencer 409 via paths 407a and 408a, respectively. Master sequencer 408 also controls digital pulse modulator 402 via path 408b.

Voltage controller 407 receives the digitized sensed voltage values from voltage-sensing module 401 and performs any value scaling that may be necessary to account for modifying factors, such as voltage dividers or voltage offsets, in order to generate substantially accurate line-side voltage values, such as $V_1$ and $V_2$. PoE detection sequencer 409 controls the operation of fixed-frequency pulse generator 411 by providing fixed-frequency pulse generator 411 turn-on and turn-off signals via path 409a. Fixed-frequency pulse generator 411 provides, via path 411a, a switching signal of substantially constant pulse-width and frequency to transistor driver 404, which amplifies the switching signal and uses it to drive transistor 305 via path 305a.

At time $T_1$, as determined by master sequencer 408, voltage $V_1$ is determined, and fixed-frequency pulse generator 411 is turned on and starts to provide a switching signal. After voltage $V_2$ is reached, at time $T_2$, $\Delta T$ is determined, and fixed-frequency pulse generator 411 may be turned off. Alternatively, after time $\Delta T$, at time $T_2$, as determined by master sequencer 408, voltage $V_2$ is determined. Using the known and measured values, PoE detection sequencer 409 determines whether those values indicate a valid or invalid capacitive signature. The determination may include calculating a value, or range of possible values, for $C_{sig}$. In an alternative embodiment, PCG circuitry 320 includes additional circuitry (not shown), such as a subtractor, which allows PCG circuitry 320 to regulate the voltage provided to the line side, as indicated by the voltage sensed by voltage-sensing module 401, in order to start detection at a particular $V_1$ value. Alternatively, a particular $V_1$ value may be set by other components (not shown) of integrated PSE controller and regulator 304.

In order to reduce the quantity and/or complexity of repetitive calculations performed by PGC circuitry 320, threshold values may be determined for $\Delta T$ based on predetermined signature capacitance threshold values for $C_{sig}$ and the known equation values discussed above. Thus, after $\Delta T$ is determined, as in the procedure described above, $\Delta T$ is compared to the predetermined $\Delta T$ threshold values to determine whether the corresponding signature capacitance $C_{sig}$ is a valid signature capacitance.

FIG. 5 shows sample graph 500 of $\Delta T$, in ms, versus $C_{sig}$, in µF, for a range of $R_{load}$ values, based on the sample component values given above, i.e., $V_{in}$=12V, $L_P$=5.35 µH, $R_{lim}$=120Ω, $R_{li}$=100 kΩ, a power transfer efficiency η of 0.85, a fixed frequency F of 500 kHz, $V_1$ of 4V, $V_2$ of 8V, and an $R_{load}$ range of 15-33 kΩ. Vertical line 501 marks the 802.3af standard's must-accept boundary of 0.15 µF, while vertical line 502 marks the 802.3af standard's must-reject boundary of 10 µF. Diagonal line 503 shows the relationship between $\Delta T$ and $C_{sig}$ when $R_{load}$ is 15 kΩ. Lower $R_{load}$ values would have $\Delta T$ vs. $C_{sig}$ lines above 503. Diagonal line 504 shows the relationship between $\Delta T$ and $C_{sig}$ when $R_{load}$ is 33 kΩ. Higher $R_{load}$ values would have $\Delta T$ vs. $C_{sig}$ lines below 503. $R_{load}$ values between 15 kΩ and 33 kΩ would have intermediate $\Delta T$ vs. $C_{sig}$ relationship lines, as can be seen, for example, with line 505, showing the $\Delta T$ vs. $C_{sig}$ relationship when $R_{load}$ is 25 kΩ.

Horizontal line 506, at approximately 12 ms, marks the intersection of vertical line 501 and diagonal line 503. Horizontal line 507, at approximately 55 ms, marks the intersection of vertical line 502 and diagonal line 504. It can be seen from FIG. 5 that, for the sample component values used, $\Delta T$ measures greater than approximately 12 ms indicate $C_{sig}$ values above the must-accept range for all possibly acceptable $R_{load}$ values. It can further be seen that $\Delta T$ measures of less than approximately 55 ms indicated $C_{sig}$ values that are below the must-reject range for all possibly acceptable $R_{load}$ values. In one exemplary embodiment, a single $\Delta T$ threshold value is set at 33 ms, marked by horizontal line 508, wherein a measured $\Delta T$ value of less than 33 ms indicates a valid $C_{sig}$, while a measured $\Delta T$ value of more than 33 ms indicates an invalid $C_{sig}$. Using the threshold of 33 ms substantially insures that for any valid $R_{load}$ value, capacitive signatures that must be rejected are rejected and capacitive signatures that must be accepted are accepted.

The lines of FIG. 5 can be extended to 470 µF and beyond in order to determine suitable thresholds so as to allow PSE port 300 to successfully detect, as valid, legacy PDs, for which valid $C_{sig}$ values are in the range of 47-470 µF. As can be seen from FIG. 5, detecting capacitive signatures in the 47-470 µF range would require a larger $\Delta T$ than for capacitive signatures in the 0-10 µF range. With appropriately set thresholds, PSE port 300 could successfully detect both PDs compatible with the 802.3af standard and legacy PDs. PSE port 300 would first attempt to detect a valid 802.3af-compatible capacitive signature, and, if that failed, continue with detection to attempt to detect a valid legacy-PD capacitive signature.

In one embodiment, capacitive signature detection is integrated with resistive signature detection, rather than being performed before or after it. Resistive signature detection is typically performed using two regulated voltages, and these voltages can be substantially the same as voltages $V_1$ and $V_2$ used for capacitive signature detection. Thus, for example, after PD 322 is connected to PSE port 300, resistive signature detection circuitry (not shown) in integrated PSE controller and regulator 304 of FIG. 3 can regulate the line-side voltage provided to PD 322 to $V_1$ and perform the appropriate resistive signature detection measurements. Then, control can pass to PGC circuitry 320, which raises the line-side voltage from $V_1$ to $V_2$ using constant power injection, measures the corresponding $\Delta T$, and determines whether PD 322 would have a valid capacitive signature for the allowable values range of $R_{load}$. If PGC circuitry 320 determines that the capacitive signature would be invalid for the range of valid $R_{load}$ values, then the resistive signature detection can terminate since PD 322 is not a valid PD. If resistive signature detection continues (whether or not the capacitive signature is determined to be valid), then the resistive signature detection circuitry regulates the line-side voltage at $V_2$ and performs the appropriate resistive signature detection measurements. If PD 322 is a valid PD, then the values for $R_{load}$ and $C_{sig}$ can be substantially determined.

In an alternative embodiment, in order to minimize errors that may be caused by a variance in the voltage provided by voltage supply 302 of FIG. 3, prior to resistive signature detection, the output of voltage supply 302 may be measured by integrated PSE controller and regulator (specific circuitry not shown). The measured voltage value can then be used in the calculations discussed above for compensating voltage-supply variations compared to nominal and more-accurate results.

Exemplary embodiments have been described with PGC circuitry controlling a transistor connected to a reference voltage on one side and to a voltage source, via a primary coil of a power transformer and a current-limiting resistor, on the other side. PGC circuitry is used in those exemplary embodiments because, at lower voltages and lower power-consumption levels, PGC circuitry is generally preferable to, e.g., pulse-width modulation (PWM) circuitry. However, as would be appreciated by one of ordinary skill in the art, PWM, pulse-frequency modulation (PFM), or other circuitry could be used instead of PGC circuitry to control the operation of the transistor and corresponding power transformer.

The embodiments described herein are exemplary. As would be appreciated by one of ordinary skill in the art, numerous variations, such as alternative power-conversion topologies, polarity inversions, path reroutes, and value scalings, are possible that would not depart from the scope of the present invention. For example, instead of employing an auxiliary coil, the primary coil of power transformer 307 of FIG. 3 can be used, with appropriate wiring and additional components, to sense the voltage across the secondary coil of transformer 307 when transistor 305 is off.

Exemplary embodiments of a PSE port have been described wherein a current-limiting resistor is located between a transistor and a primary coil of a power transformer. However, the current-limiting resistor may be placed instead between the transistor and a reference voltage, e.g., ground, without departing from the scope or spirit of the invention.

The embodiments of the invention described herein provide electrical power to the PD using a so-called flyback converter. As would be appreciate by a person of ordinary skill in the art, other power converters, e.g., Cuk, forward, boost, buck, SEPIC, etc., can be used instead, with appropriate modifications, as would be understood by the person of ordinary skill in the art.

Although the present invention has been described in the context of communication systems conforming to the IEEE 802.3 Ethernet and IEEE 802.3af PoE standards, the invention is not necessarily limited to communication systems that conform to either or both of those two standards. Moreover, as those standards may evolve over time, it is expected that implementations of the present invention can also evolve in a corresponding manner.

Although this specification describes Ethernet devices using four signal-isolation transformers and four wire pairs, the teachings of this specification apply equally well to devices using only two signal-isolation transformers and two wire pairs, or Ethernet devices using other isolation means.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements. The terms "connect," "connected," or "connection" as used herein refer to a linking that allows the transmission of electromagnetic signals. The transmission (1) may be through one or more media, (2) may be either unidirectional or bidirectional, and (3) may be direct or indirect, in which case the linking includes one or more intermediary devices. For example, transmission may take place via electrically conductive elements, radio-frequency (RF) wireless signals, infra-red (IR) wireless signals, optical fibers, capacitive coupling, magnetic coupling, or any other suitable means of signal transmission.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

We claim:

1. A method for characterizing a load connected to power sourcing equipment (PSE) having a power transformer having (i) an isolated side with a primary coil and (ii) a line side with a secondary coil connected to the load, the method comprising:
   (a) determining, by the PSE, on the isolated side, a first time and a corresponding first voltage across the load;
   (b) then generating, by the PSE, on the isolated side, a switching signal (i) having a frequency and (ii) used to generate an electrical current through the primary coil;
   (c) then determining, by the PSE, on the isolated side, a second time and a corresponding second voltage across the load; and
   (d) then characterizing the load, by the PSE, based on the frequency, the first and second voltages, and the first and second times.

2. The method of claim 1, wherein:
   the switching signal has a pulse width, wherein, for each cycle of the switching signal, the pulse width and frequency define an on interval T_on and an off interval T_off; and
   the frequency and pulse width are such that the power transformer operates in discontinuous mode, wherein:
      an electrical current through the primary coil during T_on results in an electrical current through the secondary coil during the following T_off; and
      during T_off, the electrical current through the secondary coil drops substantially to zero prior to the start of the following T_on.

3. The method of claim 1, wherein:
   the switching signal has a pulse width; and
   the pulse width and the frequency remain substantially constant during generation of the switching signal.

4. The method of claim 1, wherein the first and second voltages are determined using an auxiliary coil located on the isolated side of the power transformer.

5. The method of claim 1, wherein characterizing the load comprises determining a capacitive signature for the load based on the frequency, the first and second voltages, and the first and second times.

6. The method of claim 5, further comprising determining a resistive signature for the load prior to step (a), wherein the determined resistive signature is used to determine the capacitive signature for the load.

7. The method of claim 5, wherein the capacitive signature is determined using one or more assumed valid resistive signature values.

8. The method of claim 7, further comprising determining a resistive signature for the load using a process that comprises (i) a first phase in which a first resistive-signature voltage is provided to the line side of the PSE and (ii) a second phase in which a second resistive-signature voltage is provided to the line side of the PSE, wherein:
the first phase of resistive-signature determination is performed before capacitive-signature determination, wherein the first resistive-signature voltage is substantially equal to the first voltage determined in step (a); and
the second phase of the resistive-signature determination is performed after the capacitive-signature detection, wherein the second resistive-signature voltage is substantially equal to the second voltage determined in step (c).

9. The method of claim 1, wherein the isolated side further comprises a transistor connected in series with the primary coil and a current-limiting resistor, wherein:
the transistor, primary coil, and the current-limiting resistor are connected between a voltage source and a reference voltage; and
the switching signal controls the transistor to generate the electrical current through the primary coil.

10. The method of claim 9, wherein a difference $\Delta T$ between the first time $T_1$ and the second time $T_2$ is substantially related to the first voltage $V_1$, the second voltage $V_2$, and the frequency F by:

$$\Delta T = \frac{1}{2}\ln\left(\frac{F\cdot\eta\cdot\frac{1}{2}L_P\cdot\left(\frac{V_{in}}{R_{lim}}\right)^2 - V_1^2/R_{TLS}}{F\cdot\eta\cdot\frac{1}{2}L_P\cdot\left(\frac{V_{in}}{R_{lim}}\right)^2 - V_2^2/R_{TLS}}\right)R_{TLS}\cdot C_{TLS}$$

wherein $V_{in}$ is voltage provided by the voltage source, $R_{lim}$ is resistance of the current-limiting resistor, $\eta$ is power transfer efficiency between the primary coil and the secondary coil of the power transformer, $L_P$ is inductance of the primary coil, $R_{TLS}$ is a total line-side resistance value that is a function of resistance of the load, and $C_{TLS}$ is a total line-side capacitance value that is a function of capacitive signature of the load.

11. The method of claim 10, wherein the total line-side capacitance value $C_{TLS}$ is substantially related to the capacitive signature $C_{sig}$ of the load by:

$C_{TLS} = C_{sig} + C_{ll}$ wherein $C_{ll}$ is the total capacitance of one or more capacitors connected in parallel to the load.

12. The method of claim 1, wherein the PSE is compatible with a Power over Ethernet (PoE) standard.

13. The method of claim 1, wherein the isolated side further comprises a voltage source connected to provide the electrical current to the primary coil, the method further comprising measuring voltage provided by the voltage source and using the measured voltage in combination with the first and second voltages, the first and second times, and the frequency in characterizing the load.

14. The method of claim 1, wherein the first and second voltages are pre-defined, step (b) comprises changing the line-side voltage across the load from the first voltage to the second voltage, and step (c) comprises setting the second time to the time when it is determined that the line-side voltage across the load is substantially equal to the second voltage.

15. The method of claim 1, wherein step (d) comprises:
generating a measure indicative of capacitance of the load; and
comparing the measure to one or more specified threshold values to determine whether or not the load corresponds to a valid powered device (PD) connected to receive operating power from the PSE.

16. The method of claim 1, wherein the step of characterizing the load comprises:
determining a time difference between the first and second times; and
using the time difference as a parameter in a function to characterize the load.

17. Power sourcing equipment (PSE) having a line side and an isolated side, the PSE comprising:
a power transformer having (i) a primary coil on the isolated side and (ii) a secondary coil on the line side and connected to a load; and
power supply circuitry on the isolated side adapted to:
(a) determine a first time and a corresponding first voltage across the load;
(b) generate a switching signal (i) having a frequency and (ii) used to generate an electrical current through the primary coil;
(c) determine a second time and a corresponding second voltage across the load; and
(d) characterize the load based on the frequency, the first and second voltages, and the first and second times.

18. The PSE of claim 17, wherein the power supply circuitry comprises:
a pulse generator and controller (PGC) adapted to:
determine the first and second times and the corresponding first and second voltages;
generate the switching signal; and
characterize the load;
a voltage source;
a transistor connected to the primary coil, wherein
the transistor is adapted to be controlled by the switching signal; and
the primary coil and the transistor are connected between the voltage source and a reference voltage; and
a current-limiting resistor connected in series with the primary coil and the transistor.

19. The PSE of claim 18, wherein the PGC comprises:
a voltage-sensing module adapted to sense first and second voltage measures corresponding to the first and second voltages, respectively;
a transistor driver;
a digital pulse modulator adapted to:
generate the switching signal wherein:
the switching signal has a pulse width; and
the frequency and the pulse width remain substantially constant during generation of the switching signal; and
provide the switching signal to the transistor driver for driving the transistor; and a state controller adapted to control the digital pulse modulator.

20. The PSE of claim 17, wherein the power supply circuitry is adapted to:
  generate a measure indicative of capacitance of the load; and
  compare the measure to one or more specified threshold values to determine whether or not the load corresponds to a valid powered device (PD) connected to receive operating power from the PSE.

21. The PSE of claim 17, further comprising an auxiliary coil located on the isolated side of the power transformer, wherein the first and second voltages are determined using the auxiliary coil.

22. The PSE of claim 17, wherein the PSE is compatible with a PoE standard.

23. The PSE of claim 17, wherein the PSE is adapted to determine a resistive signature of the load and use the resistive signature to characterize the load.

24. The apparatus of claim 17, wherein characterization of the load by the power supply circuitry comprises:
  determining a time difference between the first and second times; and
  using the time difference as a parameter in a function to characterize the load.

25. Apparatus for characterizing a load connected to power sourcing equipment (PSE) having a power transformer having (i) an isolated side with a primary coil and (ii) a line side with a secondary coil connected to the load, the apparatus comprising:
  (a) means for determining, on the isolated side, a first time and a corresponding first voltage across the load;
  (b) means for then generating, on the isolated side, a switching signal (i) having a frequency and (ii) used to generate an electrical current through the primary coil;
  (c) means for then determining, on the isolated side, a second time and a corresponding second voltage across the load; and
  (d) means for then characterizing the load based on the frequency, the first and second voltages, and the first and second times.

* * * * *